United States Patent
Dinh et al.

(12) 
(10) Patent No.: US 6,434,615 B1
(45) Date of Patent: Aug. 13, 2002

(54) METHOD AND APPARATUS FOR REMOTE COMPUTER MANAGEMENT USING HTML IN A WEB BROWSER APPLICATION AND AN INTERNET SERVER EXTENSION ON AN INTERNET SERVER API-COMPLIANT WEB SERVER

(75) Inventors: Hung K. Dinh; John E. Meyer, both of Spring; John S. Harsany, Houston, all of TX (US)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

(21) Appl. No.: 09/303,151

(22) Filed: Apr. 30, 1999

(51) Int. Cl.[7] .................................................. G06F 11/30
(52) U.S. Cl. ........................ 709/224; 709/227; 709/245; 714/25
(58) Field of Search ................................ 709/245, 223, 709/224, 208, 227; 714/25, 46

(56) References Cited

U.S. PATENT DOCUMENTS

| | | | | |
|---|---|---|---|---|
| 5,491,796 A | * | 2/1996 | Wanderer et al. | ........... 709/224 |
| 5,796,953 A | * | 8/1998 | Zey | ............................ 709/227 |
| 5,896,494 A | * | 4/1999 | Perugini et al. | ............... 714/27 |
| 6,012,100 A | * | 1/2000 | Frailong et al. | ............ 709/250 |
| 6,278,694 B1 | * | 8/2001 | Wolf et al. | ................. 370/253 |

OTHER PUBLICATIONS

TCP/IP Specification, Microsoft Developer Network, pp. 1–7, Jul. 1998.

* cited by examiner

Primary Examiner—Kenneth R. Coulter
(74) Attorney, Agent, or Firm—Conley, Rose & Tayon, P.C.

(57) ABSTRACT

The present invention provides for a method and an apparatus for performing remote system administration upon a standalone computer system, using a controlling computer system. A remote communication sequence is started. The remote communication sequence is used to initiate an HTTP request to a computer destination address. Communications between the controlling computer system and the standalone computer system is established by decoding the computer destination address. A diagnostic application on the standalone computer system is initiated using the established communication between the controlling computer system and the standalone computer system.

35 Claims, 21 Drawing Sheets

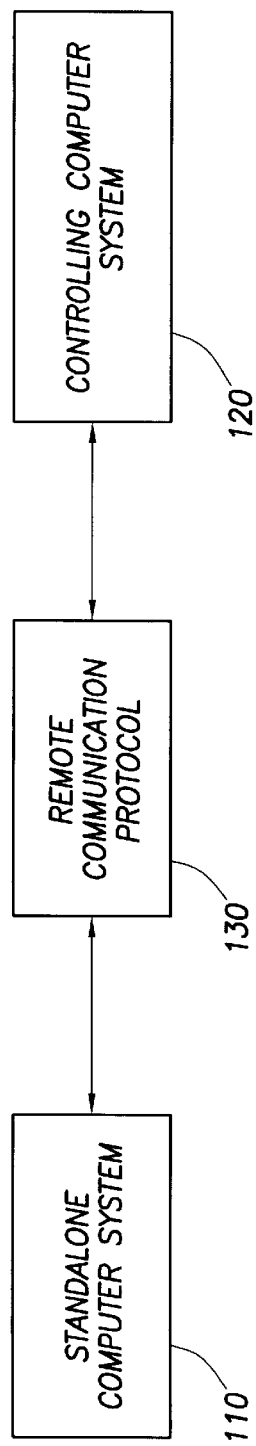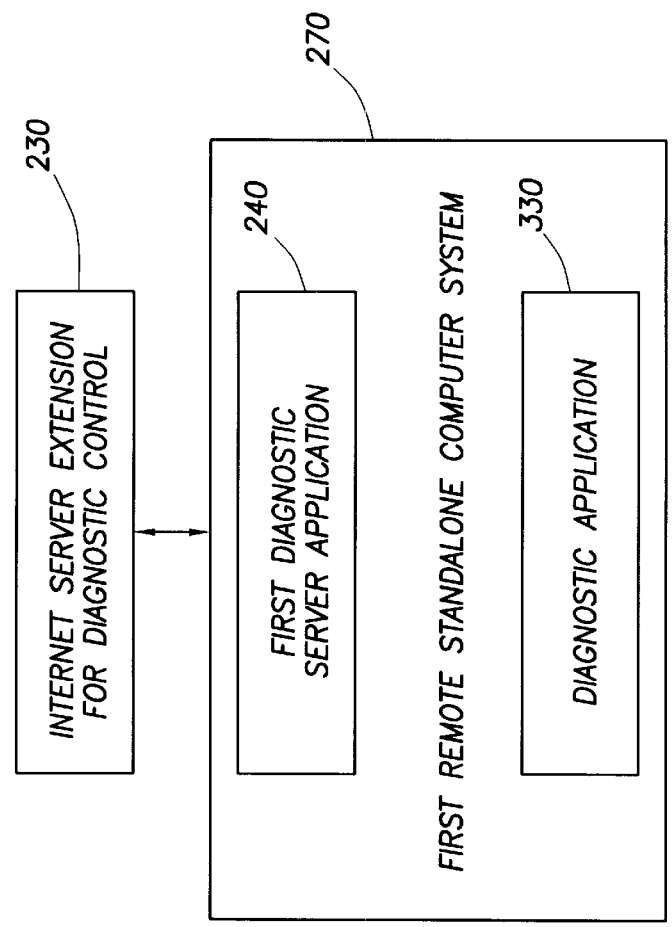

```
ip: =============INTERNET PROTOCOL==============
    STATION:172.18.216.111 ----> 255.255.255.255
    PROTOCOL: UDP
    VERSION: 4
    HEADER LENGTH (32 BIT WORDS): 5
    PRECEDENCE: ROUTINE
    NORMAL DELAY, NORMAL THROUGHPUT, NORMAL RELIABILITY
    TOTAL LENGTH: 61
    IDENTIFICATION: 40325
    FRAGMENTATION ALLOWED, LAST FRAGMENT
    FRAGMENT OFFSET: 0
    TIME TO LIVE: 128 SECONDS
    CHECKSUM: 0x18A9(VALID)
udp:============USER DATAGRAM PROTOCOL============
    SOURCE PORT: 65212
    DESTINATION PORT: 65212
    LENGTH = 41
    CHECKSUM: 0x412D(VALID)
DATA:
 0: 4A 4D 65 79 65 72 28 52 49 56 45 4E 44 45 4C 4C | JMEYER(RIVENDELL
10: 5F 4E 54 29 3A 44 46 57 20 53 65 72 76 65 72 73 | _NT) :DFW SERVERS
20: 3D                                              | =
```

FIG.5a

```
ip: ==============INTERNET PROTOCOL==============
    STATION:172.18.216.121 ----> 172.18.216.111
    PROTOCOL: TCP
    VERSION: 4
    HEADER LENGTH (32 BIT WORDS): 5
    PRECEDENCE: ROUTINE
    NORMAL DELAY, NORMAL THROUGHPUT, NORMAL RELIABILITY
    TOTAL LENGTH: 83
    IDENTIFICATION: 38089
    FRAGMENTATION NOT ALLOWED, LAST FRAGMENT
    FRAGMENT OFFSET: 0
    TIME TO LIVE: 32 SECONDS
    CHECKSUM: 0xBCCD(VALID)
tcp:==========TRANSMISSION CONTROL PROTOCOL==========
    SOURCE PORT: 22304
    DESTINATION PORT: 65213
    SEQUENCE NUMBER: 1639372525
    ACKNOWLEDGEMENT NUMBER: 686092143
    DATA OFFSET (32-BIT WORDS) 5
    WINDOW: 8760
    CONTROL BITS: 24
    CHECKSUM: 0xD7B9(VALID)
    URGENT POINTER: 0
DATA:
 0: 4A 4D 65 79 65 72 28 54 45 53 54 53 54 41 54 49 | JMEYER(TESTSTATI
10: 4F 4E 29 3A 44 46 57 20 53 65 72 76 65 72 73 3D | ON) DFW SERVERS=
20: 54 45 53 54 53 54 41 54 49 4F 4E                | TESTSTATION
```

FIG.5b

```
ip: ==============INTERNET PROTOCOL===============
     STATION:172.18.216.111 ----> 172.18.216.121
     PROTOCOL: TCP
     VERSION: 4
     HEADER LENGTH (32 BIT WORDS): 5
     PRECEDENCE: ROUTINE
     NORMAL DELAY, NORMAL THROUGHPUT, NORMAL RELIABILITY
     TOTAL LENGTH: 64
     IDENTIFICATION: 40837
     FRAGMENTATION NOT ALLOWED, LAST FRAGMENT
     FRAGMENT OFFSET: 0
     TIME TO LIVE: 128 SECONDS
     CHECKSUM: 0x5224(VALID)
tcp:===========TRANSMISSION CONTROL PROTOCOL===========
     SOURCE PORT: 65213
     DESTINATION PORT: 22304
     SEQUENCE NUMBER: 686092143
     ACKNOWLEDGEMENT NUMBER: 1639372568
     DATA OFFSET (32-BIT WORDS) 5
     WINDOW: 8717
     CONTROL BITS: 24
     CHECKSUM: 0x2FB2(VALID)
     URGENT POINTER: 0
DATA:
  0: 4A 4D 65 79 65 72 28 52 49 56 45 4E 44 45 4C 4C │ JMEYER(RIVENDELL
 10: 5F 4E 54 29 3A 41 63 6B                         │ NT) ACK
```

FIG.5c

```
ip: ==============INTERNET PROTOCOL===============
    STATION:172.18.216.111 ----> 172.18.216.121
    PROTOCOL: TCP
    VERSION: 4
    HEADER LENGTH (32 BIT WORDS): 5
    PRECEDENCE: ROUTINE
    NORMAL DELAY, NORMAL THROUGHPUT, NORMAL RELIABILITY
    TOTAL LENGTH: 113
    IDENTIFICATION: 49797
    FRAGMENTATION NOT ALLOWED, LAST FRAGMENT
    FRAGMENT OFFSET: 0
    TIME TO LIVE: 128 SECONDS
    CHECKSUM: 0x2EF3(VALID)
tcp: ============TRANSMISSION CONTROL PROTOCOL===========
    SOURCE PORT: 1251
    DESTINATION PORT: 65213
    SEQUENCE NUMBER: 686227375
    ACKNOWLEDGEMENT NUMBER: 1639507565
    DATA OFFSET (32-BIT WORDS) : 5
    WINDOW: 8760
    CONTROL BITS: 24
    CHECKSUM: 0xDA31(VALID)
    URGENT POINTER: 0
DATA:
  0: 4A 4D 65 79 65 72 28 52 49 56 45 4E 44 45 4C 4C  | JMEYER(RIVENDELL
 10: 5F 4E 54 29 3A 43 6F 6D 6D 61 6E 64 4C 69 6E 65  | _NT) COMMANDLINE
 20: 3D 43 50 51 44 49 41 47 20 2D 73 20 2D 66 6F 75  | =CPQDIAG -S -FOU
 30: 74 70 75 74 2E 64 61 74 43 6F 6D 6D 61 6E 64 54  | TPUT.DATCOMMANDT
 40: 69 6D 65 6F 75 74 3D 33 30                       | IMEOUT=30
```

FIG.5d

```
ip: ==============INTERNET PROTOCOL==============
    STATION:172.18.216.111 ----> 172.18.216.121
    PROTOCOL: TCP
    VERSION: 4
    HEADER LENGTH (32 BIT WORDS): 5
    PRECEDENCE: ROUTINE
    NORMAL DELAY, NORMAL THROUGHPUT, NORMAL RELIABILITY
    TOTAL LENGTH: 69
    IDENTIFICATION: 50053
    FRAGMENTATION NOT ALLOWED, LAST FRAGMENT
    FRAGMENT OFFSET: 0
    TIME TO LIVE: 128 SECONDS
    CHECKSUM: 0x2E1F(VALID)
tcp: ===========TRANSMISSION CONTROL PROTOCOL===========
    SOURCE PORT: 1251
    DESTINATION PORT: 65213
    SEQUENCE NUMBER: 686227448
    ACKNOWLEDGEMENT NUMBER: 1639507588
    DATA OFFSET (32-BIT WORDS) : 5
    WINDOW: 8737
    CONTROL BITS: 24
    CHECKSUM: 0x38E4(VALID)
    URGENT POINTER: 0
DATA:
 0: 4A 4D 65 79 65 72 28 52 49 56 45 4E 44 45 4C 4C | JMEYER(RIVENDELL
10: 5F 4E 54 29 3A 52 65 73 75 6C 74 73 3D          | _NT) RESULTS=
```

FIG.5e

```
ip: ===============INTERNET PROTOCOL===============
    STATION:172.18.216.111 ----> 172.18.216.121
    PROTOCOL: TCP
    VERSION: 4
    HEADER LENGTH (32 BIT WORDS): 5
    PRECEDENCE: ROUTINE
    NORMAL DELAY, NORMAL THROUGHPUT, NORMAL RELIABILITY
    TOTAL LENGTH: 69
    IDENTIFICATION: 50053
    FRAGMENTATION NOT ALLOWED, LAST FRAGMENT
    FRAGMENT OFFSET: 0
    TIME TO LIVE: 128 SECONDS
    CHECKSUM: 0x2E1F(VALID)
tcp:===========TRANSMISSION CONTROL PROTOCOL===========
    SOURCE PORT: 1251
    DESTINATION PORT: 65213
    SEQUENCE NUMBER: 686227448
    ACKNOWLEDGEMENT NUMBER: 1639507588
    DATA OFFSET (32-BIT WORDS) : 5
    WINDOW: 8737
    CONTROL BITS: 24
    CHECKSUM: 0x38E4(VALID)
    URGENT POINTER: 0
DATA:
  0: 4A 4D 65 79 65 72 28 52 49 56 45 4E 44 45 4C 4C | JMEYER(RIVENDELL
 10: 5F 4E 54 29 3A 52 65 73 75 6C 74 73 3D          |_NT) RESULTS=
```

FIG.5f

```
ip: ==============INTERNET PROTOCOL===============
    STATION:172.18.216.121 ----> 172.18.216.111
    PROTOCOL: TCP
    VERSION: 4
    HEADER LENGTH (32 BIT WORDS): 5
    PRECEDENCE: ROUTINE
    NORMAL DELAY, NORMAL THROUGHPUT, NORMAL RELIABILITY
    TOTAL LENGTH: 1500
    IDENTIFICATION: 39881
    FRAGMENTATION NOT ALLOWED, LAST FRAGMENT
    FRAGMENT OFFSET: 0
    TIME TO LIVE: 32 SECONDS
    CHECKSUM: 0xB044(VALID)
tcp: ===========TRANSMISSION CONTROL PROTOCOL===========
    SOURCE PORT: 65213
    DESTINATION PORT: 1251
    SEQUENCE NUMBER: 1639507588
    ACKNOWLEDGEMENT NUMBER: 686227477
    DATA OFFSET (32-BIT WORDS) : 5
    WINDOW: 8658
    CONTROL BITS: ACKNOWLEDGEMENT FIELD IS VALID (ACK)
    CHECKSUM: 0x2ABF(VALID)
    URGENT POINTER: 0
DATA:
  0: 4A 4D 65 79 65 72 28 54 45 53 54 53 54 41 54 49 | JMEYER(TESTSTATI
 10: 4F 4E 29 3A 41 63 6B 52 65 73 75 6C 74 73 3D 43 | ON) ACKRESULTS=C
 20: 6F 6D 70 61 71 20 44 69 61 67 6E 6F 73 74 69 63 | OMPAQ DIAGNOSTIC
 30: 73 20 66 6F 72 20 57 69 6E 64 6F 77 73 20 32 2E | S FOR WINDOWS 2.
 40: 30 30 20 28 42 45 54 41 20 30 2E 30 31 29 0D 0A | 00 :BETA 0 01
```

*FIG.5g*

APPLICATION TYPE OF DFWSVR:
  DIALOG-BASED APPLICATION TARGETING:
  WIN32

CLASSES TO BE CREATED:
 APPLICATION: CDFWSVRAPP IN DFWSVR.H AND DFWSVR.CPP
 DIALOG: CDFWSVRDLG IN DFWSVRDLG.H AND DFWSVRDLG.CPP

FEATURES:
 +ABOUT BOX ON SYSTEM MENU
 +3D CONTROLS
 +WINDOWS SOCKETS SUPPORT
 +USES SHARED DLL IMPLEMENTATION (MFC42.DLL)
 +LOCALIZABLE TEXT IN:
  ENGLISH [UNITED STATES]

FIG.6

INTERNET SERVER EXTENSION DLL PROJECT CPQDFW.MAK

DLL NAME: CPQDFW.DLL
   DLL CODE IN CPQDFW.H AND CPQDFW.CPP
   RESOURCES IN CPQDFW.RC

THIS PROJECT WILL HAVE A SERVER EXTENSION CLASS NAMED CCPQDFWEXTENSION.

YOUR PROJECT WILL BE CONFIGURED TO USE MFC IN A DLL.

FIG.7

COMPAQ
DIAGNOSTICS
      VERSION 2.14
ABOUT DEVICE HOME TEST

SYSTEM
DATE . . . . . . . . . . . . . . . . . 2/24/99
TIME . . . . . . . . . . . . . . . . . 10:09:26AM

PRODUCT . . . . . . . . . . . . . . ARMADA 7792DM

MACHINE ID
FROM SYSTEM BOARD. . . . . . . 2BC

PROCESSOR . . . . . . . . . . . . . . PENTIUM (R) W/ MMX AT 266 MHz
CPU ID . . . . . . . . . . . . . . . . 0581
NUMERIC COPROCESSOR . . . . . .INTEGRATED 387-COMPATIBLE
SECONDARY CACHE . . . . . . . . INSTALLED
SIZE . . . . . . . . . . . . . . . . . 512 KBYTES
WRITE POLICY . . . . . . . . . . . WRITE BACKE
OPTIONAL . . . . . . . . . . . . . . OPTIONAL/PERMANENT
ASSET TAG . . . . . . . . . . . . . 7804BS521071
CURRENT SYSTEM SPEED . . . . . HIGH

SYSTEM ROM
REVISION . . . . . . . . . . . . . . 3/20/98
FAMILY . . . . . . . . . . . . . . . 586S
FLASHABLE . . . . . . . . . . . . . YES
SOCKETED . . . . . . . . . . . . . NO

VIDEO CONTROLLER ROM
REVISION . . . . . . . . . . . . . . . . 12/15/97
DOES ROM SUPPORT F10 PARTITION . . . YES
BACKUP COPY OF CMOS SUPPORTED . . . NO
DOES ROM HAVE EMBEDDED DIAGNOSTICS . . NO

ARMADA 7792DM IS A TRADEMARK OF COMPAQ COMPUTER CORPORATION.

ASSETCONTROL
PRODUCT . . . . . . . . . . . . . . ARMADA 7792DM

FIG.8a

```
PROCESSOR . . . . . . . . . PENTIUM(R) W/MMX AT 266 MHz
ASSET TAG . . . . . . . . . 7804BS521071
SYSTEM BOARD REVISION LEVEL
ASSEMBLY VERSION . . . . . . .1
FUNCTIONAL REVISION LEVEL . A

INPUT DEVICES
KEYBOARD
TYPE . . . . . . . . . (101- OR 102-KEY) IBM ENHANCED/COMPATIBLE
NUMBER OF FUNCTION KEYS . . 12
WRITE BACK . . . . . . . . . . 15 ms
DELAY . . . . . . . . . . . . . . 0 ms

MOUSE
TYPE . . . . . . . . . . . . . . STANDARD PS/2 PORT MOUSE
WRITE BACK . . . . . . . . . . 1
DOUBLE CLICK TIME . . . . . . 500 ms
MAXIMUM Y POSITION . . . . . .NO

COMMUNICATION
LPT PORTS . . . . . . . . . . . LPT 1 (ADDRESS 0x0378)

COM PORTS . . . . . . . . . . .COM 1 (ADDRESS 0x03F8)
COM 2 (ADDRESS 0x02F8)

MODEM . . . . . . . . . . . . . COMPAQ SPEEDPAQ 33.6 FAX
BAUD . . . . . . . . . . . . . . 33600
PORT . . . . . . . . . . . . . . COM2
FIRMWARE. . . . . . . . . . . . 1.22

NETWORK CONTROLLER . . . . . . COMPAQ NETELLIGENT 10/100 PC CARD
TOPOLOGY . . . . . . . . . . . ETHERNET
INPUT/OUTPUT RANGE . . . . . 1000-100F
INTERRUPT REQUEST . . . . . . 15
ADAPTER ADDRESS . . . . . . . 00-80-5F-D8-50-DF

STORAGE
LOGICAL DRIVE INFORMATION

A: DISKETTE DRIVE
C: HARD DRIVE . . . . . . . . . . 1.993 GB (127 MB FREE)
D: HARD DRIVE . . . . . . . . . . 1.992 GB (38 MB FREE)
```

FIG.8b

```
E: HARD DRIVE . . . . . . . 758 MB (26 MB FREE)
F: CD-ROM DRIVE
K: REMOTE/NETWORK DRIVE
L: REMOTE/NETWORK DRIVE
N: REMOTE/NETWORK DRIVE
Q: REMOTE/NETWORK DRIVE
S: REMOTE/NETWORK DRIVE
U: REMOTE/NETWORK DRIVE

PHYSICAL DRIVE INFORMATION

IBM-DPLA-25120 HARD DRIVE
CAPACITY . . . . . . . . . . . . 5124 MB
SERIAL NUMBER . . . . . . .D34D31L5589
FIRMWARE REVISION. . . . . . PL80AB1A
INTERFACE . . . . . . . . . . . IDE
CONTROLLER . . . . . . . . . . PRIMARY
POSITION . . . . . . . . . . . . MASTER

COMPAQ CRD-S311 CDROM
FIRMWARE REVISION . . . . . . 1.05
ADAPTER . . . . . . . . . . . . . 0
TARGET . . . . . . . . . . . . . . 1
LUN . . . . . . . . . . . . . . . . .0

VIDEO
CURRENT GRAPHICS RESOLUTION . 1024 x 768

DISPLAY PANEL TYPE . . . . . . . . 4
VIDEO CONTROLLER ROM
REVISION . . . . . . . . . . . . . . 12/15/97

MEMORY
SYSTEM BOARD . . . . . . . . . . . . 16 MEGABYTES
DIMM SLOT 1 . . . . . . . . . . . . . 16 MEGABYTES
DIMM SLOT 2 . . . . . . . . . . . . . 16 MEGABYTES
TOTAL COMPAQ MEMORY . . . . . . . . 48 MEGABYTES

WINDOWS MEMORY INFORMATION
TOTAL PHYSICAL MEMORY . . . . . . 49836 KBYTES
FREE PHYSICAL MEMORY . . . . . . . 3547 KBYTES
```

*FIG.8c*

```
TOTAL VIRTUAL MEMORY . . . . 2143289 KBYTES
FREE VIRTUAL MEMORY . . . . .2037841 KBYTES

MULTIMEDIA
COMPAQ CRD-S311 CDROM
FIRMWARE REVISION . . . . . . 1.05
ADAPTER . . . . . . . . . . . . . 0
TARGET . . . . . . . . . . . . . 1
LUN . . . . . . . . . . . . . . . 0

MIXER DEVICE DRIVER(S) CAPABILITIES (SEE COMPAQ FOR TECHNICAL SUPPORT)
PRODUCT NAME (DRIVER) . . . . . ESS AUDIODRIVE (1)
COMPANY NAME . . . . . . . . . . MICROSOFT CORPORATION
PRODUCT IDENTIFIER . . . . . . . 104
DRIVER VERSION . . . . . . . . . 5.0
DESTINATION LINES . . . . . . . . 2

WAVEFORM OUTPUT DEVICE DRIVER(S) CAPABILITIES (SEE COMPAQ FOR TECHNICAL
SUPPORT)
PRODUCT NAME (DRIVER) . . . . . ESS AUDIODRIVE (1)
COMPANY NAME . . . . . . . . . . MICROSOFT CORPORATION
PRODUCT IDENTIFIER . . . . . . . 100
DRIVER VERSION . . . . . . . . . 5.0
PITCH CONTROL . . . . . . . . . . NOT SUPPORTED
PLAYBACK RATE CONTROL . . . . . NOT SUPPORTED
VOLUME CONTROL . . . . . . . . . SEPARATE LEFT AND RIGHT CONTROL
OUTPUT FORMAT . . . . . . . . . MONAURAL
FORMATS SUPPORTED . . . . . . . 11.025 kHz, 8-BIT, MONO
11.025 kHz, 8-BIT, STEREO
11.025 kHz, 16-BIT, MONO
11.025 kHz, 16-BIT, STEREO
22.050 kHz, 8-BIT, MONO
22.050 kHz, 8-BIT, STEREO
22.050 kHz, 16-BIT, MONO
22.050 kHz, 16-BIT, STEREO
44.100 kHz, 8-BIT, MONO
44.100 kHz, 8-BIT, STEREO
44.100 kHz, 16-BIT, MONO
44.100 kHz, 16-BIT, STEREO

WAVEFORM OUTPUT DEVICE DRIVER(S) CAPABILITIES (SEE COMPAQ FOR TECHNICAL
SUPPORT)
PRODUCT NAME (DRIVER) . . . . . .COMPAQ PORTABLE WAVE #00 LINE
COMPANY NAME . . . . . . . . . . .COMPAQ COMPUTER CORPORATION
PRODUCT IDENTIFIER . . . . . . . 11
```

*FIG.8d*

COMPAQ
DIAGNOSTICS     VERSION 2.14

COMPAQ DIAGNOSTICS TEST SELECTIONS
OVERALL TEST RESULTS
NUMBER OF TESTS: 4
PERCENT COMPLETED: 100
STATUS: PASSED
ELAPSED TIME: 33 SECONDS.

INDIVIDUAL TEST RESULTS
PROCESSOR 1: NUMERIC COPROCESSOR TEST PASSED
PROCESSOR 1: SPEED TEST PASSED
PROCESSOR 1: GENERAL PURPOSE REGISTER TEST PASSED
PROCESSOR 1: MMX REGISTER TEST PASSED

TROUBLESHOOTING TIPS

COMPAQ DIAGNOSTICS FOR WINDOWS REMOTE ENABLER VERSION 0.74 (8/24/98)
COMPAQ DIAGNOSTICS FOR WINDOWS VERSION 2.14 (2/22/99 11:07:44AM)
COPYRIGHT © 1997, 1998 COMPAQ COMPUTER CORPORATION. ALL RIGHTS RESERVED.

COMPAQ DIAGNOSTICS VERSION 2.14

ABOUT DEVICE HOME TEST

COMPAQ DIAGNOSTICS TEST SELECTIONS

TYPE ⊙QUICK ○COMPLETE
MODE ⊙SILENT ○INTERACTIVE

☐ SELECT ALL TESTS

☐ ALL DISKETTE DRIVE A:\ TESTS    DISKETTE DRIVE A:\ 1.44 MB (3.5 INCH)

☐ SEQUENTIAL VERIFY TEST    THIS TEST VERIFIES THE DRIVE'S ABILITY TO MOVE SEQUENTIALLY FROM TRACK TO TRACK AND HEAD TO HEAD. IT DOES THIS BY COMPUTING THE CHECKSUMS OF EACH DATA SECTOR AND COMPARING THEM WITH THE STORED CHECKSUM. THE TEST ALLOWS THE USER TO CHOOSE THE BEGINNING AND ENDING TRACK NUMBER (T) AND HEAD NUMBER (H) AND TO SET THE INCREMENT SIZE. THE TEST COMPUTES THE NEXT TRACK AND HEAD TO BE TESTED BY ADDING THE SPECIFIED TRACK AND HEAD INCREMENTS.

☐ SEQUENTIAL READ TEST    THIS TEST VERIFIES THE DRIVE'S ABILITY TO READ DATA SEQUENTIALLY FROM TRACK TO TRACK, HEAD TO HEAD, AND SECTOR TO SECTOR. THE TEST ALLOWS THE USER TO SET THE BEGINNING AND ENDING TRACK (T), HEAD (H), AND SECTOR (S) NUMBERS AND THE INCREMENT SIZES. THE TEST COMPUTES THE NEXT TRACK, HEAD, AND SECTOR NUMBERS BY ADDING THE SPECIFIED TRACK, HEAD, AND SECTOR INCREMENTS WHICH THE USERS SET PRIOR TO RUNNING THE TEST.

☐ RANDOM READ TEST    THIS TEST VERIFIES THE DRIVE'S ABILITY TO READ DATA RANDOMLY FROM TRACK TO TRACK, HEAD TO HEAD, AND SECTOR TO SECTOR. THE TEST ALLOWS THE USER TO SET THE BEGINNING AND ENDING TRACK (T), HEAD (H), AND SECTOR (S) NUMBERS AND THE PERCENT COVERAGE. THE TEST FIRST DETERMINES THE NUMBER OF TRACKS, HEADS, AND SECTORS TO READ VIA THE FOLLOWING FORMULA: (END START) x PERCENT COVERAGE=NUMBER OF READS. THE NEXT TRACK/HEAD/SECTOR IS CHOSEN RANDOMLY.

☐ ALL HARD DRIVE 1 TESTS    HARD DRIVE 1 IBM-DPLA-25120

☐ RESET TEST    THIS TEST ISSUES A RESET COMMAND TO THE DRIVE USING A V&D THAT INTERFACES TO THE ROM BIOS INT 13H.

☐ SEQUENTIAL VERIFY TEST    THIS TEST VERIFIES THE DRIVE'S ABILITY TO MOVE SEQUENTIALLY FROM TRACK TO TRACK AND HEAD TO HEAD. IT DOES THIS BY COMPUTING THE CHECKSUMS OF EACH DATA SECTOR AND COMPARING THEM WITH THE STORED CHECKSUM. THE TEST ALLOWS THE USER TO CHOOSE THE BEGINNING AND ENDING TRACK NUMBER (T) AND HEAD NUMBER (H) AND TO SET THE INCREMENT SIZE. THE TEST COMPUTES THE NEXT TRACK AND HEAD TO BE TESTED BY ADDING THE SPECIFIED TRACK AND HEAD INCREMENTS.

☐ SEQUENTIAL SEEK TEST    THIS TEST CHECKS THE DRIVE HEAD'S ABILITY TO MOVE FROM SECTOR TO SECTOR IN A STRAIGHT LINE, BEGINNING FROM THE FIRST SECTOR AND CONTINUING SEQUENTIALLY TO THE LAST SECTOR. FOR EXAMPLE, IF THE MEDIA CONTAINS 100 SECTORS, THE TEST WOULD READ AS FOLLOWS: SEEK 1,2,3,4....100.

TO FIG.10a2

FROM FIG.10a1

☐ RANDOM SEEK TEST — THIS TEST CHECKS THE DRIVE HEAD'S ABILITY TO RANDOMLY SEEK TO DIFFERENT AREAS OF THE DRIVE. THE USER CAN SPECIFY THE AMOUNT OF COVERAGE FOR THE TEST. FOR EXAMPLE, IF THE MEDIA CONTAINS 100 SECTORS, THE TEST COULD READ AS FOLLOWS: SEEK 23, SEEK 78; SEEK 45, SEEK 39; SEEK 14, SEEK 68.

☐ SEQUENTIAL READ TEST — THIS TEST VERIFIES THE DRIVE'S ABILITY TO READ DATA SEQUENTIALLY FROM TRACK TO TRACK, HEAD TO HEAD, AND SECTOR TO SECTOR. THE TEST ALLOWS THE USER TO SET THE BEGINNING AND ENDING TRACK (T), HEAD (H), AND SECTOR (S) NUMBERS AND THE INCREMENT SIZES. THE TEST COMPUTES THE NEXT TRACK, HEAD, AND SECTOR NUMBERS BY ADDING THE SPECIFIED TRACK, HEAD, AND SECTOR INCREMENTS WHICH THE USERS SET PRIOR TO RUNNING THE TEST.

☐ RANDOM READ TEST — THIS TEST VERIFIES THE DRIVE'S ABILITY TO READ DATA RANDOMLY FROM TRACK TO TRACK, HEAD TO HEAD, AND SECTOR TO SECTOR. THE TEST ALLOWS THE USER TO SET THE BEGINNING AND ENDING TRACK (T), HEAD (H), AND SECTOR (S) NUMBERS AND THE PERCENT COVERAGE. THE TEST FIRST DETERMINES THE NUMBER OF TRACKS, HEADS, AND SECTORS TO READ VIA THE FOLLOWING FORMULA: (END START) x PERCENT COVERAGE=NUMBER OF READS. THE NEXT TRACK/HEAD/SECTOR IS CHOSEN RANDOMLY.

☐ INTELLISAFE TEST — THIS TEST VERIFIES THAT NONE OF THE WARRANTABLE INTELLISAFE ATTRIBUTES EXCEEDS THE CORRESPONDING THRESHOLD. THE THRESHOLDS ARE RECORDED ON THE DRIVE BY THE HARD DRIVE VENDOR, AND THE ATTRIBUTES ARE COLLECTED BY THE HARD DRIVE FIRMWARE DURING NORMAL OPERATION.

☐ ALL CDROM1 TESTS — CDROM1 COMPAQ CRD-S311

☐ SEQUENTIAL SEEK TEST — THIS TEST CHECKS THE DRIVE HEAD'S ABILITY TO MOVE FROM SECTOR TO SECTOR IN A STRAIGHT LINE, BEGINNING FROM THE FIRST SECTOR AND CONTINUING SEQUENTIALLY TO THE LAST SECTOR. FOR EXAMPLE, IF THE MEDIA CONTAINS 100 SECTORS, THE TEST WOULD READ AS FOLLOWS: SEEK 1234...100.

THIS TEST CHECKS THE DRIVE HEAD'S ABILITY TO RANDOMLY SEEK TO DIFFERENT AREAS OF THE DRIVE. THE USER CAN SPECIFY THE AMOUNT OF COVERAGE FOR THE TEST. FOR

| | |
|---|---|
| ☐ RANDOM SEEK TEST | EXAMPLE, IF THE MEDIA CONTAINS 100 SECTORS, THE TEST COULD READ AS FOLLOWS: SEEK 23, SEEK 78; SEEK 45, SEEK 39; SEEK 14, SEEK 68. |
| ☐ SEQUENTIAL READ TEST | THIS TEST CHECKS THE DRIVE HEAD'S ABILITY TO READ FROM SECTOR TO SECTOR IN A STRAIGHT LINE, BEGINNING FROM THE FIRST SECTOR AND CONTINUING SEQUENTIALLY TO THE LAST SECTOR. FOR EXAMPLE, IF THE MEDIA CONTAINS 100 SECTORS, THE TEST WOULD READ AS FOLLOWS: SEEK 1234...100. |
| ☐ RANDOM READ TEST | THIS TEST CHECKS THE DRIVE HEAD'S ABILITY TO RANDOMLY SEEK TO DIFFERENT AREAS OF THE DRIVE. THE USER CAN SPECIFY THE AMOUNT OF COVERAGE FOR THE TEST. FOR EXAMPLE, IF THE MEDIA CONTAINS 100 SECTORS, THE TEST COULD READ AS FOLLOWS: READ 34, READ 60; READ 15, READ 88; READ 27, READ 72. |
| ☐ ALL PARALLEL PORT1 TESTS | PARALLEL PORT1 SMC@FDC37C951 |
| ☐ CONTROL REGISTER TEST | THIS TEST VERIFIES THE WRITE AND READ CAPABILITY OF THE PARALLEL PORT CONTROL REGISTER. THE TEST WRITES SPECIFIC DATA PATTERNS TO THE REGISTER AND THEN READS THE PATTERNS BACK FOR COMPARISON AND VERIFICATION. NOTE THAT ONLY THE LOWER FOUR BITS (0-3) OF THE REGISTER ARE TESTED AS THE UPPER 4 BITS (4-7) ARE RESERVED, AND DO NOT PERFORM ANY FUNCTION. BITS 0-3 ARE DESIGNATED AS FOLLOWS: BIT-0=STROBE, BIT-1=AUTOFDXT, BIT-2=INIT, AND BIT-3=SLCTIN. THE PATTERNS WRITTEN TO THE REGISTER FOR VERIFICATION ARE: 0, 0x01, 0x02, 0x04, 0x08. IF AN ERROR OCCURS, THE ERROR MESSAGE WILL CONTAIN INFORMATION SHOWING THE VALUE THAT WAS WRITTEN OUT TO THE REGISTER ALONG WITH THE ACTUAL VALUE THAT WAS READ FROM THE REGISTER. |
| ☐ DATA REGISTER TEST | THIS TEST VERIFIES THE WRITE AND READ CAPABILITY OF THE PARALLEL PORT DATA REGISTER. ALL EIGHT OF THE DATA BITS ARE TESTED. THE TEST WRITES SPECIFIC DATA PATTERNS TO THE REGISTER AND THEN READS BACK THE PATTERNS FOR COMPARISON & VERIFICATION. BITS 0-7 ARE DESIGNATED AS FOLLOWS: D0, D1, D2, D3, D4, D5, D6, & D7. THE PATTERNS WRITTEN TO THE REGISTER FOR VERIFICATION ARE 0, 0x01, 0x02, 0x04, 0x08, 0x10, 0x20, 0x40, 0x80. IF AN ERROR OCCURS, THE ERROR MESSAGE WILL CONTAIN INFORMATION SHOWING THE VALUE THAT WAS WRITTEN OUT TO THE REGISTER, ALONG WITH THE ACTUAL VALUE THAT WAS READ FROM THE REGISTER. |
| ☐ ALL SERIAL PORT1 TESTS | SERIAL PORT1 SMC@FDC37C951 |
| ☐ REGISTER TEST | THIS TEST CHECKS THE SERIAL PORT'S RECEIVE INTERRUPT ENABLE, MODEM CONTROL, AND LINE CONTROL REGISTER, BY WRITING AND READING A SET OF PREDEFINED DATA PATTERNS TO THE REGISTER AND THEN VERIFYING/COMPARING THE DATA THAT WAS WRITTEN AGAINST THE DATA THAT WAS READ. |
| ☐ INTERNAL LOOPBACK TEST | THIS TEST CHECKS THE SERIAL PORT'S RECEIVE AND TRANSMIT BUFFERS BY WRITING AND READING A SET OF PREDETERMINED DATA PATTERNS TO THESE BUFFERS AND THEN VERIFYING/COMPARING THE DATA THAT WAS WRITTEN AGAINST THE DATA THAT WAS READ. |
| ☐ ALL PROCESSOR 1 TESTS | PROCESSOR 1 9:55:28 1999s ENTRY:FA, |
| ☐ NUMERIC COPROCESSOR TEST | THIS TEST VERIFIES THAT THE NCPU IS OPERATIONAL BY PERFORMING A SERIES OF NCPU OPERATIONS. FLOATING POINT ADDITION, SUBTRACTION, MULTIPLICATION, AND DIVISION ARE PERFORMED AND THE RESULTS COMPARED TO EXPECTED VALUES. THE TEST ALSO TESTS FOR THE PENTIUM FLOATING POINT DIVIDE BUG. |

TO FIG.10b2

FROM FIG.10b1

| | | |
|---|---|---|
| ☐ | PROCESSOR SPEED TEST | THIS TEST VERIFIES THE CPU IS RUNNING AT THE CORRECT CLOCK SPEED. THE TEST DETERMINES THE CLOCK SPEED AT WHICH THE CPU IS RUNNING AND COMPARES THAT SPEED TO THE EXPECTED SPEED. IF THE ACTUAL SPEED DIFFERS FROM THE EXPECTED SPEED BY MORE THAN 2 THEN THE TEST WILL FAIL. ACTUAL SPEED IS CALCULATED USING THE TIME STAMP COUNTER (TSC) MODEL SPECIFIC REGISTER (MSR). THE TSC IS ONLY AVAILABLE ON PENTIUM AND NEWER INTEL PROCESSORS, SO THIS TEST WILL NOT WORK ON ANY INTEL PROCESSOR PRIOR TO PENTIUM. THE EXPECTED SPEED USED IN THE COMPARISON IS READ FROM THE SYSTEM INFORMATION TABLE (SIT). |
| ☐ | GENERAL PURPOSE REGISTER TEST | THIS TEST IS CARRIED OVER FROM THE MANUFACTURING DIAGS TEST SUITE AS A LEGACY TEST. WITH ITS TEST CONTENTS NOT YET RE-DEFINED FOR REVOLUTION, THE TEST IS CURRENTLY A STUBBED TEST WHICH ALWAYS PASSES, AND FOR NOW IS NOT SERVING ANY TEST FUNCTIONS. |
| ☐ | MMX REGISTER TEST | NO TEST DESCRIPTION FOUND. |
| ☐ | ALL REFRESH TIMER TEST | REFRESH TIMER 8254 TIMER 2, COUNTER 2 |
| ☐ | REFRESH TIMER TEST | THIS TEST VERIFIES THAT THE REFRESH TIMER IS OPERATIONAL BY POLLING THE REFRESH DETECT BIT AT I/O PORT 61h. THE REFRESH TIMER GENERATES THE PERIODIC REFRESH REQUEST SIGNAL THAT TRIGGERS THE DRAM REFRESH LOGIC TO BECOME BUS MASTER ONCE EVERY 15.09 MICROSECONDS SO IT CAN REFRESH ANOTHER ROW IN DRAM MEMORY THROUGHOUT THE SYSTEM. |
| ☐ | ALL REAL TIME CLOCK TESTS | REAL TIME CLOCK REAL TIME CLOCK |
| ☐ | TIME UPDATE TEST | NO TEST DESCRIPTION FOUND |
| ☐ | DATE ROLL OVER TEST | NO TEST DESCRIPTION FOUND |
| ☐ | ALL MODEM 1 TEST | MODEM1 COMPAQ SPEEDPAQ 33.6 FAX |
| ☐ | ROW/CHECKSUM TEST | THIS TEST VERIFIES THAT THE MODEM CAN READ ROM BY SENDING A AT TEST TO THE MODEM. THERE ARE TWO DIFFERENT AT TESTS: AT1 VERIFIES THAT THE MODEM CAN READ ROM; AT1 GIVES A CHECKSUM BACK FROM THE MODEM AND COMPARES WHAT IT GETS BACK TO A TABLE OF STORED VALUES. |
| ☐ | LOCAL ECHO TEST | THIS TEST ENABLES ECHO MODE FOR THE MODEM. THE TEST LOOPS DATA BETWEEN THE MODEM AND CPU. THE TEST ALLOWS THE USER TO SPECIFY THE AMOUNT AND PACKET SIZE OF THE DATA BEING SENT. IT TESTS THE PATH BETWEEN THE MODEM AND THE CPU. |

☐ ALL VIDEO CONTROLLER TESTS  VIDEO CONTROLLER S3 AURORA64V+ GRAPHICS CONTROLLER

☐ VRAM TEST  THIS TEST VERIFIES THE INTEGRITY OF THE VIDEO RAM BY WRITING AND READING FIXED AND RANDOM DATA PATTERNS FOR THE ENTIRE AMOUNT OF MEMORY.

☐ VRAM TEST  THIS TEST VERIFIES THE INTEGRITY OF THE VIDEO RAM BY WRITING AND READING FIXED AND RANDOM DATA PATTERNS FOR THE ENTIRE AMOUNT OF MEMORY.

☐ ALL TOTAL COMPAQ MEMORY TESTS  TOTAL COMPAQ MEMORY 48 MEGABYTES

☐ W/R/C TEST  THIS TEST VERIFIES MEMORY INTEGRITY BY RUNNING (i.e., W/R/C) FOUR STATIC PATTERNS ACROSS THE GIVEN TEST RANGE. THE STATIC PATTERNS USED ARE Fs, 5s, As, AND 0s. THE TEST CAN BE RUN EITHER WITH THE "BUFFERED" OR "NON-BUFFERED" OPTION. WITH THE BUFFERED OPTION, THE PATTERNS ARE FIRST GENERATED IN A SMALL "HOLDING" BUFFER, THEN POPULATED FROM THIS BUFFER INTO THE LARGER MEMORY BLOCK UNDER TEST. THIS SUBSTANTIALLY DECREASES TEST TIME, AS PATTERNS ARE NOT REGENERATED FOR EACH TEST BLOCK TESTED; HOWEVER, THIS INCREASES THE AMOUNT OF MEMORY REQUIRED TO RUN THE TEST. WITH THE "NON-BUFFERED" OPTION, THE PATTERNS ARE GENERATED AT THE TIME OF WRITING INTO THE MEMORY BLOCK UNDER TEST. ALTHOUGH THIS INCREASES THE TEST TIME, LESS MEMORY IS REQUIRED TO RUN THE SAME GIVEN TEST TYPE

☐ NOISE TEST  THIS TEST VERIFIES MEMORY INTEGRITY BY WRITING THE INVERSE OF THE CURRENT TEST ADDRESS TO THE CURRENT TEST ADDRESS. THE CURRENT TEST ADDRESS ALTERNATES BETWEEN THE START AND THE END OF THE CURRENT TEST BLOCK, INCREMENTING OR DECREMENTING THE ADDRESS BY 4 BYTES UNTIL THE ENTIRE BLOCK HAS BEEN ACCESSED.

☐ RANDOM DATA TEST  THIS TEST VERIFIES MEMORY INTEGRITY BY RUNNING RANDOM PATTERNS ACROSS THE GIVEN TEST RANGE USING A BLOCK OF GIVEN STEP SIZE. THE RANDOM PATTERNS AND THEIR INVERSES ARE REPEATED EVERY TEST BLOCK OVER THE TEST RANGE. THUS, RANDOMIZATION INCREASES AS THE STEP SIZE INCREASES. THE TEST CAN BE RUN EITHER WITH THE "BUFFERED" OR "NON-BUFFERED" OPTION. WITH THE BUFFERED OPTION, THE PATTERNS ARE FIRST GENERATED IN A SMALL "HOLDING" BUFFER, THEN POPULATED FROM THIS BUFFER INTO THE LARGER MEMORY BLOCK UNDER TEST. THIS SUBSTANTIALLY DECREASES TEST TIME, AS PATTERNS ARE NOT REGENERATED FOR EACH TEST BLOCK TESTED; HOWEVER, THIS INCREASES THE AMOUNT OF MEMORY REQUIRED TO RUN THE TEST. WITH THE "NON-BUFFERED" OPTION, THE PATTERNS ARE DYNAMICALLY GENERATED AT THE TIME OF WRITING INTO THE MEMORY BLOCK UNDER TEST. ALTHOUGH THIS INCREASES THE TEST TIME, LESS MEMORY IS REQUIRED TO RUN THE SAME GIVEN TEST TYPE.

☐ RANDOM ADDRESS TEST  THIS TEST VERIFIES MEMORY INTEGRITY BY RUNNING RANDOM PATTERNS ACROSS THE GIVEN TEST RANGE. THE ADDRESS USED TO INLAY THE PATTERNS IS RANDOM AND NORMALIZED TO FIT WITHIN THE CURRENT TEST BLOCK. IF A RANDOM ADDRESS HAS ALREADY BEEN USED WITHIN THE TEST BLOCK, THE NEXT AVAILABLE ADDRESS (SEQUENTIAL FROM THE START OF THE TEST BLOCK) IS USED.

TO FIG.10c2

FROM FIG.10c1

☐ WALK TEST — THIS TEST VERIFIES MEMORY INTEGRITY BY RUNNING A WALKING 0 AND WALKING 1 PATTERN ACROSS THE GIVEN TEST RANGE, USING A BLOCK OF GIVEN STEP SIZE. THE TEST CAN BE RUN EITHER WITH THE "BUFFERED" OR "NON-BUFFERED" OPTION. WITH THE BUFFERED OPTION, THE PATTERNS ARE FIRST GENERATED IN A SMALL "HOLDING" BUFFER, THEN POPULATED FROM THIS BUFFER INTO THE LARGER MEMORY BLOCK UNDER TEST. THIS SUBSTANTIALLY DECREASES TEST TIME, AS PATTERNS ARE NOT REGENERATED FOR EACH TEST BLOCK TESTED; HOWEVER, THIS INCREASES THE AMOUNT OF MEMORY REQUIRED TO RUN THE TEST. WITH THE "NON-BUFFERED" OPTION, THE PATTERNS ARE DYNAMICALLY GENERATED AT THE TIME OF WRITING INTO THE MEMORY BLOCK UNDER TEST. ALTHOUGH THIS INCREASES THE TEST TIME, LESS MEMORY IS REQUIRED TO RUN THE SAME GIVEN TEST TYPE.

☐ MARCH TEST — THIS TEST PERFORMS A MARCH B TEST, WHICH IS OUTLINED IN "TESTING SEMICONDUCTOR MEMORIES" BY A.J. VAN DE GOOR. THE TEST IS SIMILAR TO A TRUE WALK BIT TEST AND IS ABLE TO DETECT THE FOLLOWING: ADDRESS FAULTS, STUCK-AT FAULTS, TRANSITION FAULTS, COUPLING FAULTS, AND LINKED COUPLING FAULTS. THE TEST CAN ONLY BE RUN IN THE "NON-BUFFERED" OPTION.

☐ ADDRESS TEST — THIS TEST CHECKS MEMORY ADDRESSABILITY BY PERFORMING A SINGLE-ADDRESS LINE ENABLE (A0 ON, OTHERS OFF; A1 ON, OTHERS OFF, ETC.), CHECKERBOARD (A0 ON, A1 OFF, A2 ON, ETC.) AND INVERSE CHECKERBOARD PATTERN, AND AN ALL ON (A0, A1, ETC. ON) PATTERN ON THE ADDRESS LINES UP TO INSTALLED MEMORY.

☐ STRESS TEST — THIS TEST EXERCISES WINDOWS 95 VIRTUAL MEMORY PAGE SWAPPING THROUGH A SERIES OF ALLOCATION REQUESTS SUCH THAT MEMORY USAGE WILL FAR EXCEED THE SYSTEM'S ACTUAL PHYSICAL MEMORY, WHILE EXECUTING THE MEMORY RANDOM ADDRESS TEST.

☐ NVT TEST — NO TEST DESCRIPTION FOUND.

☐ DRAM TEST — NO TEST DESCRIPTION FOUND.

[ BEGIN TESTING ]

TROUBLESHOOTING TIPS

COMPAQ DIAGNOSTICS FOR WINDOWS REMOTE ENABLER VERSION 0.74 (8/24/98)
COMPAQ DIAGNOSTICS FOR WINDOWS VERSION 2.14 (2/22/99 11:07:44AM)
COPYRIGHT © 1997, 1998 COMPAQ COMPUTER CORPORATION. ALL RIGHTS RESERVED.

*FIG.10c2*

METHOD AND APPARATUS FOR REMOTE COMPUTER MANAGEMENT USING HTML IN A WEB BROWSER APPLICATION AND AN INTERNET SERVER EXTENSION ON AN INTERNET SERVER API-COMPLIANT WEB SERVER

BACKGROUND OF THE INVENTION

1. Field of the Invention

This invention relates generally to remote computer accessing, and, more particularly, to performing computer diagnostics and computer management using Hypertext Markup Language (HTML) in a Web Browser application along with an Internet server extension on an Internet server API-compliant web server.

2. Description of the Related Art

Performing computer diagnostics and computer management are essential tasks for maintaining proper operation of computers. Modern computers have multiple complex hardware components that cooperate to perform computer operations. Integration of complex hardware and software in computers can result in several technical problems that compromise optimal performance of computers. Many times, a computer professional's services are required to remedy computer diagnostic problems.

Much of the consultations performed by computer experts are conducted via the telephone. Often, a computer user will communicate with a computer consultant over a telephone and run certain computer software and report back to the computer consultant. This can be a tedious as well as an inefficient process. Many times, the computer operator will not be familiar with the software and hardware details to properly advise the computer consultant of the problems at hand. The computer consultant is then forced to iteratively narrow down possible hardware or software problems.

Often, a computer consultant performs an on-site or off-site inspection of a computer that has been experiencing operational problems. Alternatively, a computer which is experiencing operational problems is taken off-site, to a computer consultant. Both of the options, on-site and off-site inspections, are very time-consuming and costly. Several diagnostic evaluations must be performed on a computer which is experiencing operational problems before a course of corrective actions is taken. One of tools utilized by computer experts is the execution of a diagnostic application. Generally, the execution of a diagnostic application initiates a series of tests on a computer system. Often the knowledge of an experienced computer technician is required to evaluate the results of the tests performed by the diagnostic application. Computer systems are generally complex and may host many peripheral devices that must cooperate properly. Consequently, software systems that analyze and diagnose computer systems are increasingly complex. Therefore, users who are not extensively trained in evaluation of computer systems are often unable to properly execute the computer diagnostic application.

Many times, attempts to evaluate and resolve computer problems over a telephone conversation are futile since the computer user may not be able to execute the computer diagnostic application and report back the results. Therefore, a site visit from a computer technician is often the only practical solution for some computer-related problems. The cost associated with a site-visit by a computer technician compounds the problems related to computer malfunction. Beyond the cost of the consultation from a computer technician, a delay due to the non-operation of the computer system while awaiting a site visit, could bring about additional productivity-related costs. A visit from a computer technician not only halts productivity before the technician arrives, productivity could be suspended while the technician performs tests, evaluation, and repairs on the computer system.

The present invention is directed to overcoming, or at least reducing the effects of, one or more of the problems set forth above.

SUMMARY OF THE INVENTION

In one aspect of the present invention, a method is provided for performing remote system administration upon a standalone computer system, using a controlling computer system. A remote communication sequence is started. The remote communication sequence is used to initiate an HTTP request to a computer destination address. Communications between the controlling computer system and the standalone computer system is established by decoding the HTTP request. A diagnostic application on the standalone computer system is initiated using the established communication between the controlling computer system and the standalone computer system.

In another aspect of the present invention, an apparatus is provided for performing remote system administration upon a standalone computer system, using a controlling computer system. The apparatus of the present invention further comprises: means for starting a remote communication sequence; means for using the remote communication sequence to initiate an HTTP request to a computer destination address; means for establishing communications between the controlling computer system and the standalone computer system by decoding the computer HTTP request; and means for initiating a diagnostic application on the standalone computer system using the established communication between the controlling computer system and the standalone computer system.

BRIEF DESCRIPTION OF THE DRAWINGS

The invention may be understood by reference to the following description taken in conjunction with the accompanying drawings, in which like reference numerals identify like elements, and in which:

FIG. 1 is an illustration of one embodiment of the apparatus that facilitates the implementation of the present invention: a block diagram of a controlling computer system communicating with a standalone computer system using a remote communication protocol;

FIG. 3 illustrates a more detailed depiction of the communication system described in FIG. 2;

FIGS. 5a–5g illustrate one embodiment of a TCP/IP socket communication packet flow for the present invention;

FIG. 6 illustrates one embodiment of the diagnostic server application employed by the present invention;

FIG. 7 illustrates one embodiment of the implementation of the Internet Server Extension (ISAPI DLL) in the HTTP communication server relating to a skeleton control project using Microsoft® Visual C++AppWizard®;

FIGS. 8a–8d illustrate one example of the inspection of the hardware and software on a standalone computer, performed by Compaq Diagnostics® and reported over the Internet or Intranet, as implemented by the present invention;

FIG. 9 illustrates one example of the status check of a standalone computer, performed by Compaq Diagnostics® and reported over the Internet or Intranet, as implemented by the present invention; and FIGS. 10a–10c illustrate one example of a screen display, in Compaq Diagnostics® software, that allows a user to perform remote testing of a standalone computer system, as implemented by the present invention.

Figure 2:
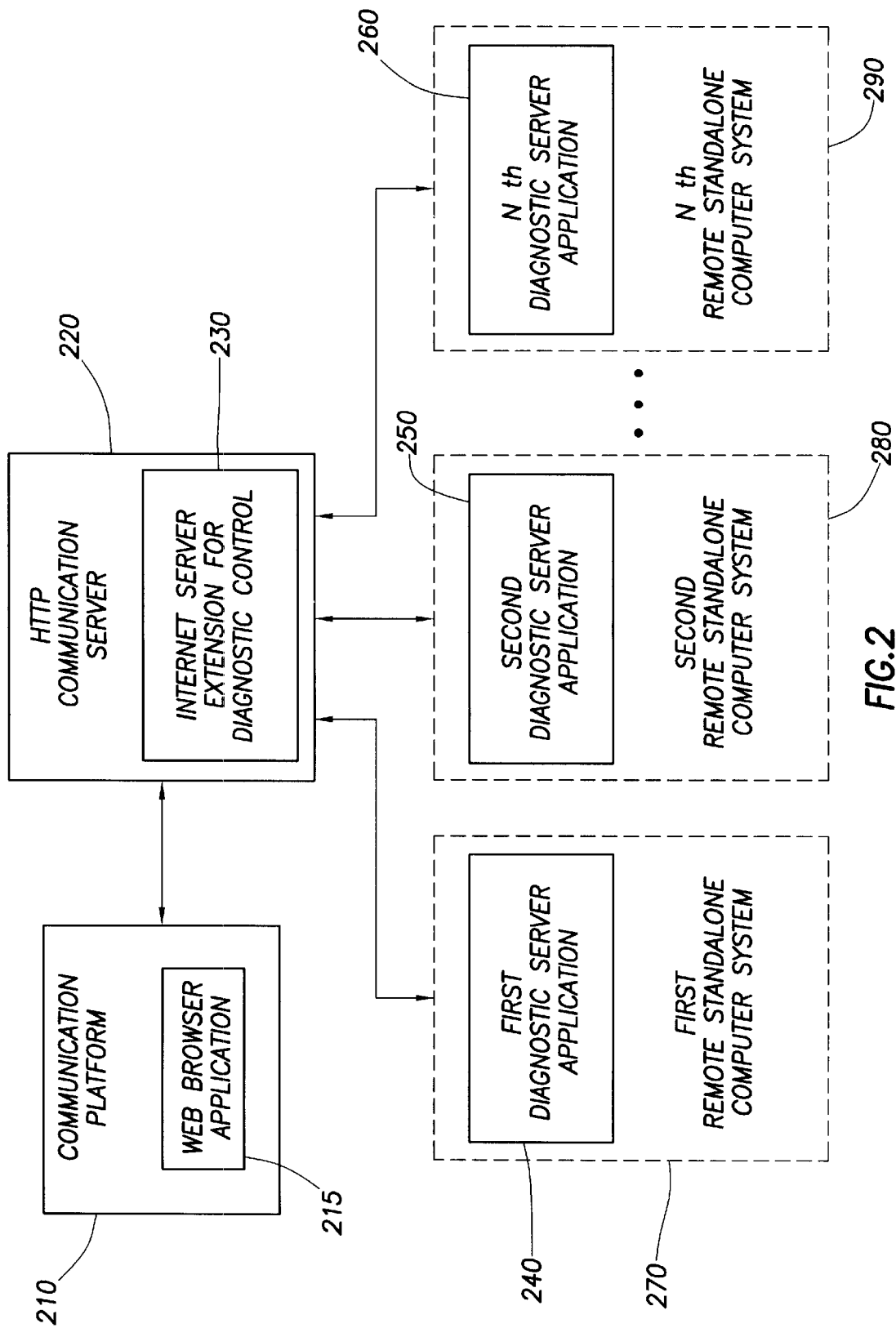
FIG. 2 illustrates one embodiment of the remote communications protocol described in FIG. 1.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Turning now to FIG. 1, one embodiment of a system that employs the present invention is illustrated. A standalone computer system 110 is electronically connected to a controlling computer system 120 through a remote communication protocol 130. The standalone computer system 110, in one embodiment, is a client computer system that is operational at a remote site, such as an office or a home. In one embodiment, the controlling computer system 120 is a computer controlled by a computer technician. Generally, the controlling computer system 120 is located at a remote office (not shown). In one embodiment, the standalone computer system 110 and the controlling computer system 120 may be comprised of a Macintosh system, a UNIX system, a PC system, a VAX system, a Work-station system, or any other system employed by those skilled in the art.

The remote communication protocol 130, in one embodiment, consists of a communication system that allows the controlling computer system 120 to perform system administration tasks upon the standalone computer system 110. One embodiment of the remote communications protocol 130 is illustrated in FIG. 2.

Turning now to FIG. 2, one embodiment of a more detailed depiction of the remote communication protocol 130 is illustrated. A communication platform 210 is electronically coupled to a communication server 220. The communication platform 210 includes a web browser application 215 for Internet/Intranet communication. In one embodiment, the communication platform 210 and the communication server 220 are located in the controlling computer system 120. The communication server 220 facilitates data transfer between the standalone computer system 110 and the controlling computer system 120. The communication server 220 directs diagnostic controls from the web browser application 215 through a first through Nth diagnostic server application 240, 250, 260, and onto a first through Nth standalone computer system 270, 280, 290. In one embodiment, the Internet server extension for diagnostic control 230 is located within the controller computer system 120. The Internet server extension for diagnostic control 230 facilitates system administration tasks that are performed by the controlling computer system 120, upon the first through Nth remote standalone computer systems 270, 280, 290.

In one embodiment, the Internet server extension for diagnostic control 230 is electronically coupled with the first through Nth remote standalone computer systems 270, 280, 290. The first through Nth diagnostic server applications 240, 250, 260 are located within the first through Nth remote standalone computer system, respectively.

In one embodiment, communications between the controlling computer system 120 and the first through Nth remote standalone computer systems 270, 280, 290 are facilitated by a web browser, within the web browser application 215, in the communication platform 210. Hypertext Transfer Protocol (HTTP) and Hypertext Markup Language (HTML) format are employed by the present invention to facilitate communications between the controlling computer system 120 and the first through Nth remote standalone computer systems 270, 280, 290.

HTML is a set of "markup" symbols or codes inserted in a file intended for display on a World Wide Web browser. The markup tells the Web browser how to display a Web page's words and images for the user. HTML is defined in practice by both of the major Web browser developers, Netscape® and Microsoft®. Netscape® and Microsoft® are in the process of adding changes to their respective Web browsers, and more officially, for the industry through the World Wide Web Consortium (W3C). A new version of HTML, called HTML4 has recently been officially recommended by the W3C, making this level an effective industry standard. However, both Netscape® and Microsoft® web browsers currently implement some features differently and provide non-standard extensions. Web developers using the more advanced features of HTML4 may have to design pages for both browsers and send out the appropriate version to the users. Significant features in HTML4 are sometimes described in general as dynamic HTML. The method and apparatus taught by the present invention can be implemented on different types of Web browser applications.

Generally, the controlling computer 120 addresses the first remote standalone computer system 270 through the first diagnostic server application 240 via the communication platform 210. Once communication is established between the controlling computer 120 and the remote standalone computer system 270, computer diagnostics can be performed. The Internet server extension for diagnostic control 230 controls a computer administration process that is capable of performing multiple status and diagnostic checks on remote standalone computer systems. In one example, the controlling computer system 120 will perform an overview status check on the remote standalone computers 270, 280, 290. Such a status will yield information such as remote standalone computer's processor type, the total memory in the remote standalone computer 270, peripheral devices that are interfaced with the remote standalone computer 270, etc. The controlling computer system 120 will be able to display a screen that is substantially similar to the screen that would be displayed if a local diagnostic application were to be executed locally on the remote standalone computers 270, 280, 290. The system administration performed on the first through Nth remote standalone computer systems 270, 280, 290 are performed in a similar manner.

Utilizing the remote communication protocol 130, the controlling computer system 120 can display a screen that list the status of the subsystems of the remote standalone computers 270, 280, 290, such as the status of input devices (not shown). These input devices include the keyboard, joystick, mouse, etc. Therefore, if a problem regarding any of the aforementioned subsystems is suspected, an operator using the controlling computer system 120 will be able to address the problem by accessing the status of the subsystems and narrowing down the list of possible causes of the problem. Furthermore, utilizing the remote communication protocol 130, an operator can test the internal memory of the remote standalone computers 270, 280, 290 by accessing their respective memory sections and testing them.

In one embodiment, one test performed on the internal memory of the remote standalone computers 270, 280, 290 includes performing a write and read back test. The write and read-back test includes writing certain values into the internal memory locations of the remote standalone computers 270, 280, 290 and then reading and verifying the values to insure that memory locations are functioning properly. Other remote diagnostic tests can be performed on the remote standalone computers 270, 280, 290 by utilizing the remote communication protocol 130 describe in the present invention.

Turning now to FIG. 3, a more detailed depiction of the communication system described in FIG. 2 is illustrated. The Internet server extension for diagnostic control 230 facilitates Winsocket® communication with the first remote standalone computer system 270. The first diagnostic server application 240, located within the first remote standalone computer system 270, sends and receives data to and from the Internet server extension for diagnostic control 230. When the first diagnostic server application 240 checks and confirms a data packet sent by the controlling computer 120 to the first remote standalone computer system 270, a communication link between the controlling computer 120 and the first remote standalone computer system 270, is established. Communications between the controlling computer system 120 and the second through Nth remote standalone computer systems 280, 290 are also performed in a similar manner.

The first through Nth remote standalone computers 270, 280, 290 contain a diagnostic application 330 that is accessible through the diagnostic server application 240. The first diagnostic server application 240 facilitates data transfer between a web browser application 215 and the first through Nth remote standalone computers 270, 280, 290. The diagnostic server applications 240, 250, 260, in conjunction with the web browser application 215, initiates and controls the diagnostic application 330 via an Internet or Intranet path.

The controlling computer system 120, which in one embodiment contains the web browser application 215, can gain access to the diagnostic applications 330 in the first through Nth remote standalone computers 260, 270, 280 through the communication path described above. Utilizing the software and hardware computer communication system described above, the controlling computer system 120 can perform system administration on the first through Nth remote standalone computers 260, 270, 280.

Figure 4:
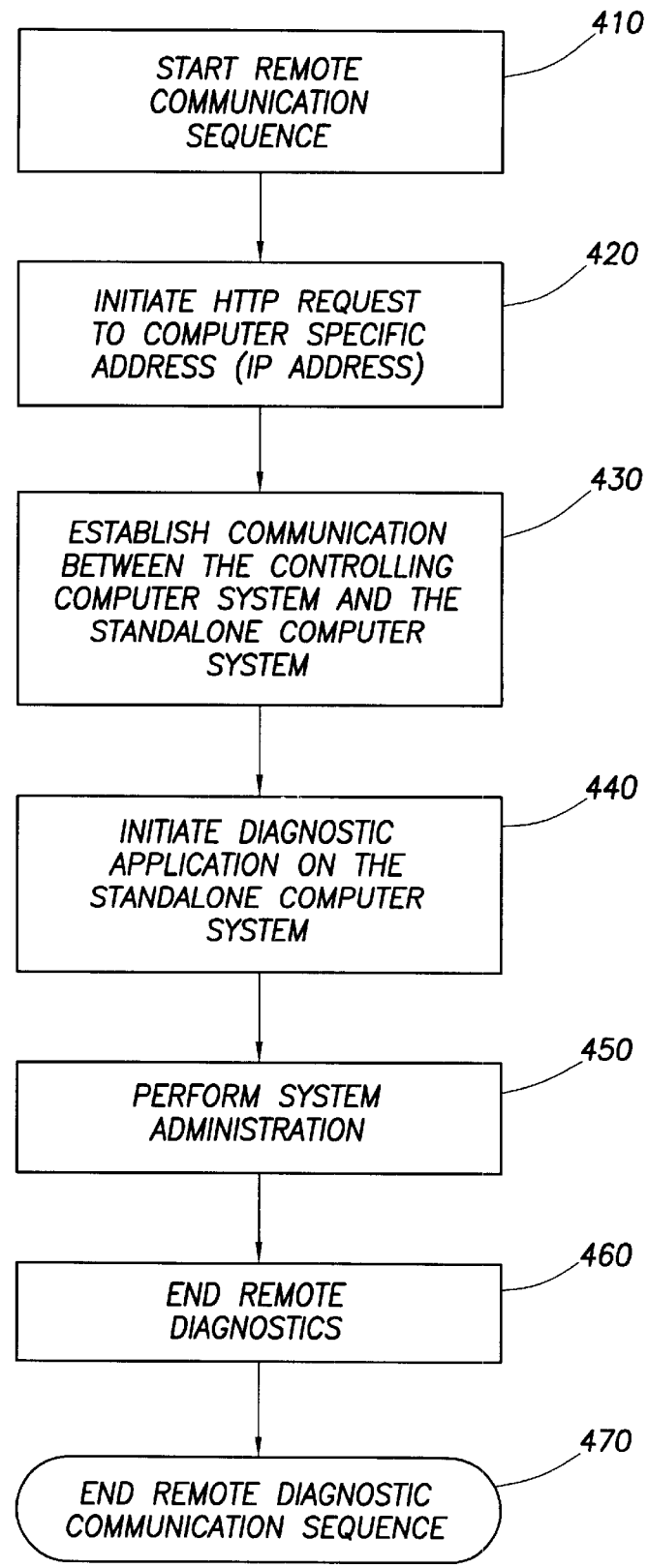
FIG. 4 illustrates a block diagram of the method of system administration by the controlling computer described in FIG. 1.

A block diagram of the method of system administration by a controlling computer system is illustrated in FIG. 4.

Turning now to FIG. 4, the remote system administration described by the present invention is initiated by starting a remote communication sequence, as described in block 410.

In one embodiment, the controlling computer 120 initiates an HTTP request to a specific IP address. In one embodiment, the Internet server extension for diagnostic control 230 in the HTTP communication server 220 receives the request and sends a Winsocket® data packet to the diagnostic server applications 240, 250, 260. When the first diagnostic server applications 240 decodes the diagnostic command for the first remote standalone computer 270, an Internet/Intranet communication line is established between the controlling computer system 120 and the first remote standalone computer system 270. Communications between the controlling computer system 120 and the second through Nth remote standalone computer systems 280, 290 are facilitated in a similar manner.

In one embodiment, the remote communication protocol 130 is capable of employing an Internet Server Application Programming Interface (ISAPI). The ISAPI protocol is well known by those skilled in the art and have the benefit of the present invention. One example of the Internet Server Application Programming Interface (ISAPI) is a communication technology offered by Microsoft®. In one embodiment, the present invention employs an ISAPI Dynamic Link Library (DLL) application for the operation on the HTTP communication server 220, for Internet/Intranet communications. Operations of DLL applications are well known by those skilled in the art and have the benefit of the present invention. In one embodiment, the ISAPI DLL application is operable on the Windows® NT Internet Information Server operating system.

ISAPI applications provide a simple and efficient method of facilitating communication to multiple ISAPI-compliant Hypertext Transfer Protocol (HTTP) servers located within the HTTP communication server 220. Hypertext Transfer Protocol (HTTP) is the set of rules for exchanging files on the World Wide Web. The files exchanged under the HTTP guide-lines include text files, graphic image files, sound files, video files, and other multimedia files. Essential concepts that are part of HTTP include the idea that files can contain references to other files whose selection will elicit additional transfer requests. Generally, Web server machines contain, in addition to the HTML and other files it can serve, an HTTP daemon. The HTTP daemon is a program that is designed to wait for HTTP requests and handle them when they arrive. The Web browser is an HTTP client, sending requests to server machines. When the user of the Web browser enters file request by either "opening" a Web file by typing in a Uniform Resource Locator (URL), or clicking on a hypertext link, the Web Browser builds an HTTP request and sends it to the Internet Protocol address (IP address) indicated by the URL. The HTTP daemon in the destination server machine receives the request and, after any necessary processing, the requested information is returned.

Generally, Internet Server Applications (ISA) operate in the same address space as the HTTP servers. Furthermore, the ISA is capable of accessing all computer resources available to the HTTP servers located within the HTTP communication server 220. Internet Server Applications generally have low overhead (relating to computer resources) because they do not require the creation of additional processes. Furthermore, the ISA will consume low overhead because they generally do not perform time-consuming communications across process boundaries.

In one embodiment, the communication sequence facilitated by the communication server 220 incorporates the web browser application 310 and the Internet server extension (not shown). The communication sequence is further implemented by integrating the ISA platform (not shown) with a Microsoft® Windows Sockets® application programming interface (API). The Microsoft Windows® API is well known by those skilled in the art and have benefit of the present applications. The specifications of Windows Sockets®, known by those skilled in the art, are used to integrate the use of the API and the Internet Protocol Suite, generally referred to as TCP/IP, which is known to those skilled in the art. One embodiment of the TCP/IP socket communication packet flow is illustrated in FIG. 5a through FIG. 5g.

As described in block 430 of FIG. 4, communications with the controlling computer system 120 and the standalone computer system 110 is established using the remote communication protocol 130 described in the present invention. In one embodiment, to establish communications between the controlling computer system 120 and the standalone computer system 110, two applications are used to implement TCP/IP communications. The first application is a server application. The server application monitors a specific TCP/IP port on a network for a launch request of the Compaq Diagnostics® and returns any requested result to the client. One embodiment of the server application is illustrated in FIG. 6.

The second application is a client application that locates the diagnostic application 330, such as Compaq Diagnostics®, in the first through Nth remote standalone computer systems 270, 280, 290. The diagnostic server applications 240, 250, 260 send requests to the diagnostic application 330 to gather hardware and software information and perform diagnostic tests. In one embodiment, the ISAPI server extension DLLs are developed to be loaded and called by the HTTP server (not shown). In one embodiment, users of the communication platform 210 can fill forms in the web browser applications 215 and engage a submit command to send data to the HTTP communication server 220, and invoke the ISA. The ISA can process the sent information to provide custom content. The HTTP communication server 220 can then use the received request to build web pages dynamically. The built web pages are sent to the communication platform 210 to be displayed.

In one embodiment, the diagnostic server applications 240, 250, 260 are generated using control development facilities built into Visual C++ and MFC, which are known by those skilled in the art and who have benefit of the present invention. An ISAPI DLL built program called the ISAPI Wizard®, is used to help create an MFC DLL program. In one embodiment, implementation of the Internet server extension in the client application is performed by creating a skeleton control project using Microsoft® Visual C++ AppWizard®, as shown in FIG. 7.

The diagnostic application 330, such as Compaq Diagnostics®, is initiated on the standalone computer system 110, as described in block 440 of FIG. 4. Utilizing the communication system described above, the controlling computer system 120 performs system administration on the standalone computer system 110, as described in block 450 of FIG. 4. The system administration tasks performed on the standalone computer system include inspection of the hardware and software, status checks, hardware tests, and asset management.

One example of inspection of the hardware and software in a standalone computer 110, performed by Compaq Diagnostics® and reported over the Internet or Intranet, is illustrated in FIG. 8. As illustrated in FIG. 8, the computer system type, the processor type, the storage device type, the software version are detected remotely, using the principles of the present invention. Computer information, such as the expansion bus and the current computer system speed, can be obtained by using the principles described in the present invention. One example of the information on a standalone computer 110, performed by the Compaq Diagnostics® application and reported over the Internet or Intranet, is illustrated in FIG. 9.

Many types of hardware and software tests can be performed upon a standalone computer 110 using the principles taught by the present invention. One example of a hardware test is to write to a certain register in the main Central Processing Unit (CPU), and read back the value in that particular register. If the data that was written in the CPU register is read back correctly, then the write/read test can be deemed successful. Other hardware tests, such as testing of computer peripherals, can be performed using the present invention. One example of a screen display, in the Compaq Diagnostics® application, that allows a user to perform remote testing of a standalone computer system 110, is illustrated in FIG. 10.

Other system administration tasks, such as asset management of computer peripherals, can be performed by implementing the present invention. Audit trails of peripherals in standalone computer systems 110, such as computer systems within a corporate office, can be performed to ensure that computer peripherals are not changed or displaced without authorization. Other system administration tasks can be performed by the implementing the principles taught by the present invention.

Once the desired system administration is performed on the standalone computer system 110, the remote diagnostic operation is terminated, as described in block 460 of FIG. 4. The remote diagnostic communication sequence is then terminated, as described in block 470 of FIG. 4. At this point, control of the standalone computer 110 is relinquished by the controlling computer system 120. The principles taught by the present invention may be utilized by one skilled in art and having the benefit of the present disclosure, to perform various computer-related tasks from a remote location.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for performing remote system administration upon a standalone computer system, using a controlling computer system, comprising:

starting a remote communication sequence;

using said remote communication sequence to initiate an HTTP request to a computer destination address;

establishing communications between said controlling computer system and said standalone computer system by decoding said computer destination address; and initiating a diagnostic application on said standalone computer system using said established communication between said controlling computer system and said standalone computer system.

2. The method as described in claim 1, wherein starting a remote communication sequence further comprises initiating a web browser application, using a communication platform coupled with a communication server.

3. The method as described in claim 2, wherein using a communication platform further comprises using a web browser application.

4. The method as described in claim 1, wherein using said remote communication sequence to initiate an HTTP request to a computer destination address further comprises integrating an Internet server extension with said communication server.

5. The method as described in claim 4, wherein integrating an Internet server extension with said communication server further comprises integrating said application program interface with an Internet protocol suite to establish a TCP/IP communication link.

6. The method as described in claim 5, wherein initiating a diagnostic application on said standalone computer system using said established communication between said controlling computer system and said standalone computer system further comprises initiating a diagnostic application on said standalone computer system through said Internet protocol communication link.

7. The method as described in claim 1, wherein establishing communications between said controlling computer system and said standalone computer system using said communication control platform further comprises employing a server application capable of monitoring data requests.

8. The method as described in claim 1, wherein establishing communications between said controlling computer system and said standalone computer system using said communication control platform further comprises employing a client application capable of supplying requested data.

9. The method as described in claim 1, wherein establishing communications between said controlling computer system and said standalone computer system using said communication control platform further comprises employing an HTTP request detector to monitor data requests.

10. The method as described in claim 1, wherein establishing communications between said controlling computer system and said standalone computer system using said communication control platform further comprises employing a driver application to supply and receive data.

11. The method as described in claim 1, wherein initiating a diagnostic software application on said standalone computer system using said established communication between said controlling computer system and said standalone computer system further comprises said controlling computer system performing computer diagnostic operations on said standalone computer system using said established communication between said controlling system and said standalone computer.

12. The method as described in claim 11, wherein performing computer diagnostic operations on said standalone computer system further comprises performing status checks on said standalone computer system.

13. The method as described in claim 11, wherein performing computer diagnostic operations on said standalone computer system further comprises performing system inspection on said standalone computer system.

14. The method as described in claim 11, wherein performing computer diagnostic operations on said standalone computer system further comprises performing tests on said standalone computer system.

15. The method as described in claim 14, wherein performing tests on said standalone computer system further comprises performing tests on a central processing unit (CPU) of said standalone computer system.

16. The method as described in claim 14, wherein performing tests on said standalone computer system further comprises performing tests on subsystems of said standalone computer system.

17. The method as described in claim 1, wherein initiating a diagnostic application on said standalone computer system using said established communication between said controlling computer system and said standalone computer system further comprises said controlling computer system performing computer asset management functions on said standalone computer system using said established communication between said controlling system and said standalone computer.

18. An apparatus for performing remote system administration upon a standalone computer system, using a controlling computer system, comprising:

means for starting a remote communication sequence;

means for using said remote communication sequence to initiate an HTTP request to a computer destination address;

means for establishing communications between said controlling computer system and said standalone computer system by decoding said computer destination address; and means for initiating a diagnostic application on said standalone computer system using said established communication between said controlling computer system and said standalone computer system.

19. A computer readable program storage device encoded with instructions that, when executed by a computer, performs a method for performing remote system administration upon a standalone computer system, using a controlling computer system, comprising:

starting a remote communication sequence;

using said remote communication sequence to initiate an HTTP request to a computer destination address;

establishing communications between said controlling computer system and said standalone computer system by decoding said computer destination address; and initiating a diagnostic application on said standalone computer system using said established communication between said controlling computer system and said standalone computer system.

20. The computer readable program storage device encoded with instructions that, when executed by a computer, performs the method as described in claim 19, wherein starting a remote communication sequence further comprises initiating a web browser application, using a communication platform coupled with a communication server.

21. The computer readable program storage device encoded with instructions that, when executed by a computer, performs the method as described in claim 20, wherein using a communication platform further comprises using a web browser application.

22. The computer readable program storage device encoded with instructions that, when executed by a computer, performs the method as described in claim 19, wherein using said remote communication sequence to initiate an HTTP request to a computer destination address further comprises integrating an Internet server extension with said communication server.

23. The computer readable program storage device encoded with instructions that, when executed by a computer, performs the method as described in claim 22, wherein integrating an Internet server extension with said communication server further comprises integrating said application program interface with an Internet protocol suite to establish a TCP/IP communication link.

24. The computer readable program storage device encoded with instructions that, when executed by a computer, performs the method as described in claim 23, wherein initiating a diagnostic application on said standalone computer system using said established communication between said controlling computer system and said standalone computer system further comprises initiating a diagnostic application on said standalone computer system through said Internet protocol communication link.

25. The computer readable program storage device encoded with instructions that, when executed by a computer, performs the method as described in claim 19, wherein establishing communications between said controlling computer system and said standalone computer system using said communication control platform further comprises employing a server application capable of monitoring data requests.

26. The computer readable program storage device encoded with instructions that, when executed by a computer, performs the method as described in claim 19, wherein establishing communications between said controlling computer system and said standalone computer system using said communication control platform further comprises employing a client application capable of supplying requested data.

27. The computer readable program storage device encoded with instructions that, when executed by a computer, performs the method as described in claim 19, wherein establishing communications between said controlling computer system and said standalone computer system using said communication control platform further comprises employing an HTTP request detector to monitor data requests.

28. The computer readable program storage device encoded with instructions that, when executed by a computer, performs the method as described in claim 19, wherein establishing communications between said controlling computer system and said standalone computer system using said communication control platform further comprises employing a driver application to supply and receive data.

29. The computer readable program storage device encoded with instructions that, when executed by a computer, performs the method as described in claim 19, wherein initiating a diagnostic application on said standalone computer system using said established communication between said controlling computer system and said standalone computer system further comprises said controlling computer system performing computer diagnostic operations on said standalone computer system using said established communication between said controlling system and said standalone computer.

30. The computer readable program storage device encoded with instructions that, when executed by a computer, performs the method as described in claim 29, wherein performing computer diagnostic operations on said standalone computer system further comprises performing status checks on said standalone computer system.

31. The computer readable program storage device encoded with instructions that, when executed by a computer, performs the method as described in claim 29, wherein performing computer diagnostic operations on said standalone computer system further comprises performing system inspection on said standalone computer system.

32. The computer readable program storage device encoded with instructions that, when executed by a computer, performs the method as described in claim 29, wherein performing computer diagnostic operations on said standalone computer system further comprises performing tests on said standalone computer system.

33. The computer readable program storage device encoded with instructions that, when executed by a computer, performs the method as described in claim 32, wherein performing tests on said standalone computer system further comprises performing tests on a central processing unit (CPU) of said standalone computer system.

34. The computer readable program storage device encoded with instructions that, when executed by a computer, performs the method as described in claim 32, wherein performing tests on said standalone computer system further comprises performing tests on subsystems of said standalone computer system.

35. The computer readable program storage device encoded with instructions that, when executed by a computer, performs the method as described in claim 19, wherein initiating a diagnostic application on said standalone computer system using said established communication between said controlling computer system and said standalone computer system further comprises said controlling computer system performing computer asset management functions on said standalone computer system using said established communication between said controlling system and said standalone computer.

* * * * *